Aug. 4, 1931.  K. T. PENICK ET AL  1,817,095
PUMP PACKING
Filed April 29, 1929
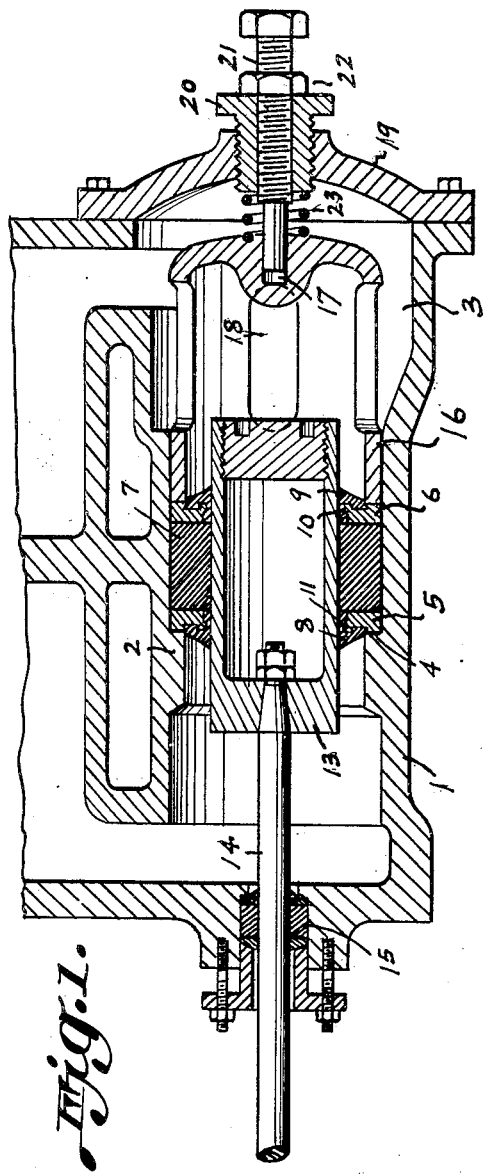
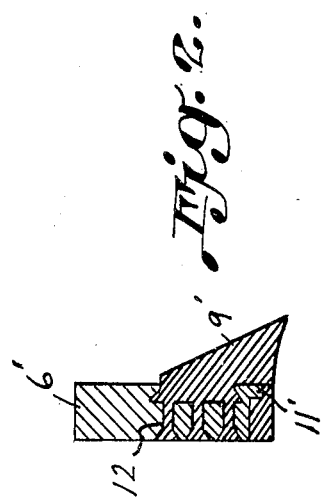

Patented Aug. 4, 1931

1,817,095

UNITED STATES PATENT OFFICE

KIRBY T. PENICK, ARTHUR J. PENICK, AND HERBERT WILLIAM MILLMINE, OF HOUSTON, TEXAS

PUMP PACKING

Application filed April 29, 1929. Serial No. 359,148.

This invention relates to new and useful improvements in a pump.

One object of the invention is to provide in a pump, a novel type of plunger packing anchored to the cylinder wall and through which the plunger works, as well as novel means for maintaining a close fit of the packing about the plunger; the invention also comprehends novel means for adjusting the packing.

With the above and other objects in view this invention has particular relation to certain novel features of construction, operation and arrangement of parts an example of which is given in this specification and illustrated in the accompanying drawings wherein:—

Figure 1 shows a fragmentary longitudinal sectional view of a pump disclosing the improvements, and Figure 2 shows an enlarged fragmentary sectional view of the packing, slightly modified in form.

Referring now more particularly to the drawings, wherein like numerals of reference designate similar parts in each of the figures the numeral 1, designates the casing of a pump and the numeral 2 designates one of the pump cylinders. A slush pump has been shown for the purpose of illustration wherein there is an intake chamber 3 and a discharge (not shown) arranged in the conventional manner. At, or near, one end the cylinder is reduced forming an annular abutment 4 against which the annular end plate 5 rests. Spaced from the end plate 5 there is an annular follower plate 6 and between these plates there is a sleeve like packing 7, formed of rubber, or rubberized composition, or other suitable packing material. The inner margins of the plates 5, 6 are faced with packing rings, as 8, 9, formed of rubber, rubberized fabric, or other suitable packing material, which are connected, or joined to said plates by the sutures 10, 11. In the form shown in Figure 2 the plates, as 6′, in addition to the suture 11′, forming a connection between the plate and packing ring 9′, is also provided with perforations, as 12, through which the material of the packing ring 9′ is moulded to form additional means for securing said ring 9′ to the plate 6′.

The plunger 13 works through said packing above described and forms a fluid tight joint therewith. The plunger is attached to the plunger rod 14, which works through the stuffing box 15 in the pump casing, and through which the plunger is reciprocated.

There is a tubular cage 16 which fits closely against the follower plate 6 and whose outer end is closed and provided with a deep socket 17. This cage has the openings 18 to permit the free passage of fluid therethrough. Opposite the outer end of the cage the pump casing has a removable end plate 19 with a plug 20 screwed therein and threaded through this plug there is an adjusting rod 21 whose inner end is blank and fitted into the socket 17. Threaded onto the rod 21 and abutting the outer end of the plug 2 there is a lock nut 22.

Interposed between the plug 20, and the outer end of the cage 16 there is a strong coil spring 23 which operates to hold the cage yieldingly against the follower plate 6 and thus holds the plunger packing under compression and closely about the plunger. The packing is thus permitted to yield but forms a fluid tight joint with the said plunger.

When the packing becomes worn so as to fit too loosely about the plunger the adjusting rod may be tightened up, to increase the tension on the spring 23 which in turn will compress the packing more closely about the plunger; or in case the packing fits the plunger too closely the tension on said spring may be relieved, in an obvious manner.

What we claim is:—

1. In a pump having a casing, a cylinder therein and a plunger reciprocable in the cylinder; packing in the cylinder around the plunger, said packing comprising annular end plates, packing rings anchored to said end plates and terminating in annular lips which closely surround the plunger, and an expansible sleeve between said end plates.

2. In a pump having a casing, a cylinder therein and a plunger reciprocable in the cylinder; packing in the cylinder around the plunger, said packing comprising annular end plates, packing rings anchored to said end plates, an expansible sleeve between said end plates, an abutment in the cylinder against which one end of the packing abuts and means working against the other end of said packing.

3. A packing for forming a tight joint between a stationary part and a relatively movable part comprising a sleeve around said movable part formed of yieldable material, rigid, annular plates abutting the ends of said sleeve, and annular packing elements anchored to said rigid plates, and terminating in oppositely extended annular lips which fit closely around said movable part.

4. A packing for working against a relatively movable part and comprising a sleeve, annular end plates therefor, packing rings one attached to each plate, said rings being extended outwardly and terminating in annular lips shaped to fit closely against said relatively movable part.

5. In a packing for forming a fluid tight joint with an adjacent part, an annular follower plate an annular packing ring attached to said plate said ring terminating in an extended annular lip shaped to fit closely against said adjacent part.

In testimony whereof we have signed our names to this specification.

KIRBY T. PENICK.
ARTHUR J. PENICK.
HERBERT WILLIAM MILLMINE.